US007764955B1

(12) United States Patent
Mangal et al.

(10) Patent No.: US 7,764,955 B1
(45) Date of Patent: *Jul. 27, 2010

(54) METHOD AND SYSTEM FOR ROUTING A CALL BASED ON CALLING DEVICE TYPE

(75) Inventors: Manish Mangal, Overland Park, KS (US); Doug Williams, Olathe, KS (US); Fred Rogers, Olathe, KS (US); Larry Young, Gardner, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1385 days.

This patent is subject to a terminal disclaimer.

(21) Appl. No.: 10/405,312

(22) Filed: Apr. 2, 2003

(51) Int. Cl.
*H04M 3/42* (2006.01)
(52) U.S. Cl. .................. 455/417; 370/396; 379/111; 379/211.02; 379/218.01; 379/265.13; 455/406; 455/414.1; 455/425; 709/224
(58) Field of Classification Search .......... 455/417, 455/445, 420, 406, 414.1, 425; 379/211.02, 379/265.02, 111, 218.01, 265.13; 370/396
See application file for complete search history.

(56) References Cited

U.S. PATENT DOCUMENTS

| 5,323,444 | A | * | 6/1994 | Ertz et al. .................. 379/45 |
| 5,563,931 | A | * | 10/1996 | Bishop et al. ............ 455/404.1 |
| 5,797,093 | A | * | 8/1998 | Houde .................... 455/404.1 |
| 5,799,249 | A | * | 8/1998 | Kennedy et al. ............ 455/411 |
| 5,845,207 | A | * | 12/1998 | Amin et al. .............. 455/414.1 |
| 5,887,253 | A | * | 3/1999 | O'Neil et al. ............... 455/418 |
| 6,014,561 | A | * | 1/2000 | Molne ...................... 455/419 |
| 6,038,438 | A | * | 3/2000 | Beeson et al. ............ 455/404.2 |
| 6,052,372 | A | * | 4/2000 | Gittins et al. ............... 370/396 |
| 6,097,944 | A | * | 8/2000 | Sandahl ................... 455/422.1 |
| 6,167,255 | A | * | 12/2000 | Kennedy et al. .......... 455/414.1 |
| 6,295,346 | B1 | * | 9/2001 | Markowitz et al. ...... 379/127.01 |
| 6,381,315 | B1 | * | 4/2002 | Nhaissi ...................... 379/111 |
| 6,381,325 | B1 | * | 4/2002 | Hanson ................. 379/218.01 |
| 6,400,940 | B1 | * | 6/2002 | Sennett .................... 455/414.1 |
| 6,404,884 | B1 | * | 6/2002 | Marwell et al. ......... 379/265.13 |
| 6,501,956 | B1 | * | 12/2002 | Weeren et al. .............. 455/463 |
| 6,744,858 | B1 | * | 6/2004 | Ryan et al. .................... 379/45 |
| 6,778,659 | B2 | * | 8/2004 | Andersen ............... 379/265.02 |
| 6,799,052 | B2 | * | 9/2004 | Agness et al. ............ 455/456.4 |
| 6,859,649 | B1 | * | 2/2005 | Denenberg et al. .......... 455/406 |
| 7,047,004 | B1 | * | 5/2006 | Tolbert, II .................... 455/425 |
| 7,116,974 | B2 | * | 10/2006 | Begeja et al. ................ 455/417 |
| 7,155,226 | B1 | * | 12/2006 | Oh et al. ..................... 455/445 |
| 7,493,384 | B1 | * | 2/2009 | Philyaw ..................... 709/224 |
| 7,606,358 | B2 | * | 10/2009 | McGary et al. ......... 379/218.01 |

(Continued)

FOREIGN PATENT DOCUMENTS

WO    WO 9800956  A2  *  1/1998

*Primary Examiner*—Gerald Gauthier

(57) ABSTRACT

A method and system for routing a call based on calling device type is disclosed. In a communication network, an originating switch may receive a call request from a calling device seeking to connect with a dialed number. The originating switch may responsively send into a signaling system a call-setup message that conveys information including a calling device type indicator, such as a serial number of the calling device. A controller may then use the calling device type as a basis to select a destination to which the call should be routed in order to facilitate connecting with the dialed number. The invention can be usefully employed to facilitate routing of customer service calls concerning a calling device.

16 Claims, 4 Drawing Sheets

U.S. PATENT DOCUMENTS

2003/0100293 A1* 5/2003 Hunt ........................ 455/414
2004/0203730 A1* 10/2004 Fraser et al. ............ 455/426.1
2006/0177035 A1* 8/2006 Cope et al. ............ 379/211.02
2007/0093250 A1* 4/2007 Italia et al. ................ 455/445

* cited by examiner

METHOD AND SYSTEM FOR ROUTING A CALL BASED ON CALLING DEVICE TYPE

FIELD OF THE INVENTION

The present invention relates to telecommunications, and more particularly to setting up telephone calls to a destination such as a customer service center, for instance.

BACKGROUND

In the existing art, when a person calls a customer service center from a landline or wireless telephone, the customer service center can receive the person's phone number through well known caller ID (automatic number identification (ANI)) techniques. Conveniently, the customer service center can then look up the person's phone number in a back-end database to determine information about the person (such as name, address, account information, etc.) and can use that information in assisting the person.

In some cases, for instance, the customer service center might use the calling phone number to determine the type of telephone that the person is operating, in order to assist the person with issues related to that telephone. This may occur, for example, in a cellular telephone system, where a carrier might operate a customer service center to which subscribers can call in order to get assistance with use of their cell phones.

When a cellular subscriber calls the customer service center, the center may retrieve the subscriber's phone number (e.g., "mobile directory number" (MDN)) through use of caller-ID or user input and may then query a back-end database to find out the electronic serial number (ESN) of the calling phone. In turn, the center may query another back-end database to determine the make (e.g., manufacturer), model and configuration of the cell phone that has that serial number. With this knowledge, a customer service operator can then readily assist the caller with issues related to use of the cell phone.

SUMMARY

The present invention provides an improved mechanism for routing calls to a customer service center or other destination. Generally speaking, the exemplary embodiment involves (i) receiving into a telephone network a request to connect a call placed from a calling telephone device to a dialed number, and then (ii) the telephone network using a serial number or device type indicator of the calling telephone device as a basis to determine where to route the call in the network in order to connect the call with the dialed number.

According to an exemplary embodiment of the invention, for instance, when an originating switch that serves a given telephone seeks to set up a call placed by the telephone, the switch will send into a signaling system a call setup message that indicates at least (i) the calling number, (ii) a serial number of the calling device, and (iii) the called number. The signaling system will then convey that signaling message to a controller, and the controller will use the serial number as a basis to select an endpoint switch to which the call should be routed.

The controller will then send into the signaling system a response signaling message that indicates the selected endpoint switch, and the signaling system will cause the originating switch and/or other switches in the network to route the call to the selected endpoint switch. The selected endpoint switch will then connect the call to a destination telephone device at the dialed number.

Further, the controller could forward the serial number to the destination telephone device for use by the destination telephone device in handling the incoming call For instance, the destination telephone device could be an interactive voice response unit (IVRU), which could use the serial number to intelligently interact with the caller. As another example, the destination telephone device could be an automated call distribution (ACD) server, which could use the serial number to route the call to an operator terminal best suited to handle calls regarding that calling device.

Preferably, the serial number of the calling device will uniquely identify the calling device compared with all other devices. For instance, the serial number could include subcodes that indicate aspects of the calling device such as make, model and unit number. Alternatively, rather than uniquely identifying the calling device, the serial number may serve merely to identify the type of calling device, such as the make and model of the device. More generally, the serial number may uniquely identify the calling device type, such as its make, model and/or configuration.

In the exemplary embodiment, the originating switch may receive the serial number of the calling device in a call origination message that the calling device sends into the network. An example of this could occur where the calling device is a cell phone that initiates a phone call by sending to a local switch an origination message that carries the cell phone's MDN and ESN (traditionally for authentication purposes) as well as the dialed digits. The local switch may thus receive the ESN in that origination message and then include the ESN in the call setup message that it sends into the signaling system.

Alternatively, the originating switch may determine (e.g., learn) the serial number of the calling device in some other way. For example, the switch may consult translation data to find the serial number of the device to which the calling number is assigned (assuming no more than one device is registered to be able to place calls from that calling number). Or a service control point or other node may perform such a translation at the request of the switch and may report the serial number in a response to the switch.

The originating switch may then send the signaling message into the signaling network in any form. For instance, the signaling message could be an ISDN user part (ISUP) initial address message (IAM) message or a session initiation protocol (SIP) INVITE message, carrying at least the parameters noted above. An ISUP IAM would typically pass to a signal transfer point (STP), which would forward it to a destination point code. And a SIP INVITE would typically pass to a SIP proxy, which would forward it to a destination SIP address. Still other sorts of signaling messages could be used instead.

The exemplary embodiment can be advantageously used to assist in setting up customer service calls, so as to facilitate routing of a call to a customer service center and/or operator that is best equipped to handle calls regarding the type of device that is calling.

For example, when a user places a customer service call from a given calling device, an originating switch may responsively send into a signaling system a call setup message that indicates the parameters noted above, including the calling device serial number. The signaling system may then pass that call setup message, or parameters from the message, along to a customer service routing controller. In turn, the controller may then determine, based at least in part on the serial number of the calling device, which of several customer service locations is best suited to handle the call. And the controller may then signal back into the signaling system with an instruction to route the call to a destination switch serving that particular customer service location. The signaling system may then cause the call to be routed to that destination switch, and the destination switch may connect the call to a customer service ACD system.

Further, the controller may pass the serial number as well as other information along to the ACD system. And the ACD system may then use the serial number, as well as other information such as current load distribution data, to determine which operator terminal or group of operator terminals should take the call. The ACD system may then extend the call to that terminal or group for handling.

These as well as other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
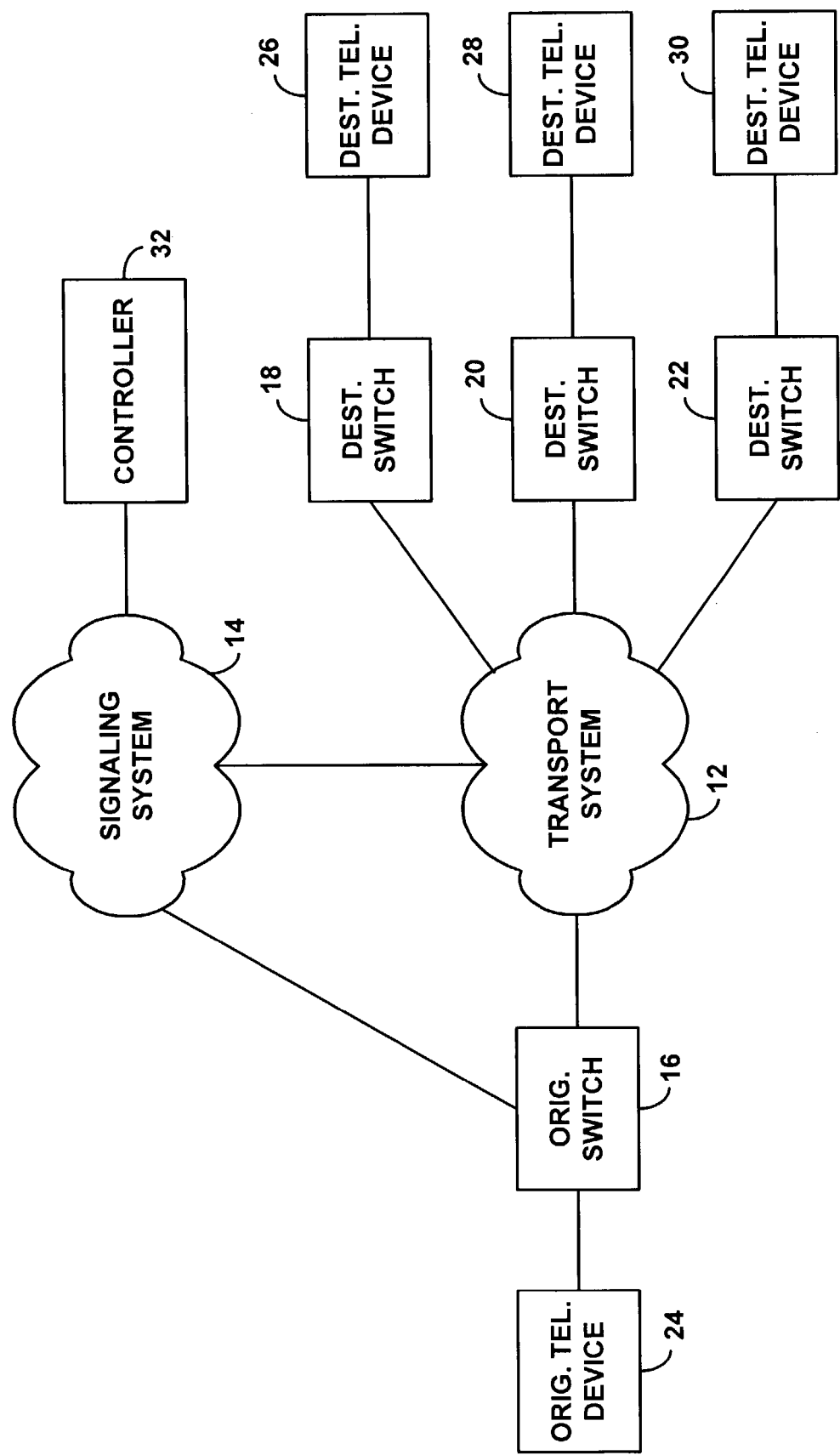
FIG. 1 is a block diagram of a communication system in which the exemplary embodiment can be employed.

Referring to the drawings, FIG. 1 is a simplified block diagram of a communication system in which an exemplary embodiment of the present invention can be employed. The arrangement of FIG. 1 includes at its core a transport system 12 and a signaling system 14. The transport system and signaling system are shown as separate network clouds, but they could just as well reside on a common physical network, such as a packet network for instance.

The transport system 12 may comprise circuit-switched and/or packet-switched components. For instance, the transport system may include switches and circuit trunks of the public switched telephone network (PSTN) and/or routers and links of a packet-switched network (e.g., IP or ATM) such as the Internet or a private intranet or other network. The transport system may take other forms as well.

The signaling system 14 may similarly take various forms. For example, the signaling system may comprise a common channel interoffice signaling (CCIS) system, which could reside on a packet-switched network that is separate from the transport system. More specifically, the signaling system may comprise a signaling system #7 (SS7) system, which operates generally as known by those skilled in the art to facilitate setup and tear down of phone calls. As such, the signaling system may comprise one or more STPs to carry ISUP signaling messages from point to point.

As another example, the signaling system could comprise a SIP-based system, which would include one or more SIP servers functioning to pass SIP signaling messages from point to point. Operation of SIP is also well known to those skilled in the art.

As still another example, the signaling system could comprise one or more media gateway controllers that function to control particular media gateways or other switching points in the transport system. One such media gateway controller might control multiple media gateways, for instance. The arrangement and operation of such media gateways and media gateway controllers, or "soft switches," are also well known in the art.

Still further, various nodes within the signaling system 14 could translate between signaling protocols, so as to facilitate interoperability of various signaling protocols. For instance, an ISUP signaling message could be sent into the signaling system and could pass to a signaling point that translates the message into a SIP INVITE or into an IS-41 Route Request message. The translated signaling message could then pass to a next signaling point or to its final destination. Other examples are also possible.

In the arrangement shown in FIG. 1, the transport system 12 provides connectivity between an originating switch 16 and multiple destination switches, three of which are shown as switches 18, 20, 22 by way of example. Although the originating switch 16 and destination switches 18, 20, 22 are shown as entities separate from the transport system 14, they may in fact be nodes on the transport system. Further, although this description refers to these nodes as "switches," it should be understood that a switch could be any network node that receives and forwards traffic. Thus, any of the switches shown in FIG. 1 could be a traditional "switch," a router, a gateway, a proxy server, or another analogous entity.

The originating switch 16 may serve one or more telephone devices, an example of which is shown as originating telephone device 12. Further, each destination switch serves one or more destination telephone devices. Thus, by way of example, FIG. 1 shows destination switch 18 serving a destination telephone device 24, destination switch 20 serving destination telephone device 26, and destination switch 22 serving a destination telephone device 28.

Each originating and destination telephone device could range in complexity from a simple telephone to a multicomponent system. For instance, an exemplary telephone device might be a traditional landline or wireless phone, a voice-over-packet (VoP) phone (e.g., IP phone, Etherphone, etc.), a fax machine, a computer modem, a PBX/CTI server, or another entity or combination of entities. Further, other examples of destination telephone devices are an automated voice response unit (e.g., interactive voice response (IVR) unit or VXML platform) and an ACD server. Still other examples are possible as well.

Sitting as a node on signaling system 14, or accessible via the signaling system 14, is a controller 32. The controller 32 may also take various forms and could be located in various locations. For example, the controller could be an intelligent router that is associated with destination switches 18, 20, 22 and/or with destination telephone devices 26, 28, 30, which could function to determine which switch and/or device is best suited to handle a particular call, based at least in part on a serial number of the calling device. As another example, the controller could be a service control point (SCP), a home location register (HLR), or some other network entity, which could reside within or outside of the signaling system.

The arrangement of FIG. 1 may include additional entities and links not shown, and some of the entities and links shown could be omitted, combined or distributed in various ways. For example, controller 32 and/or originating switch 16 might include or have access to a database that correlates device serial numbers with device characteristics, such as make, model and configuration. As another example, controller 32 may be linked with destination switches 18, 20, 22 and/or with destination telephone devices 26, 28, 30, through one or more intermediate entities.

Figure 2:
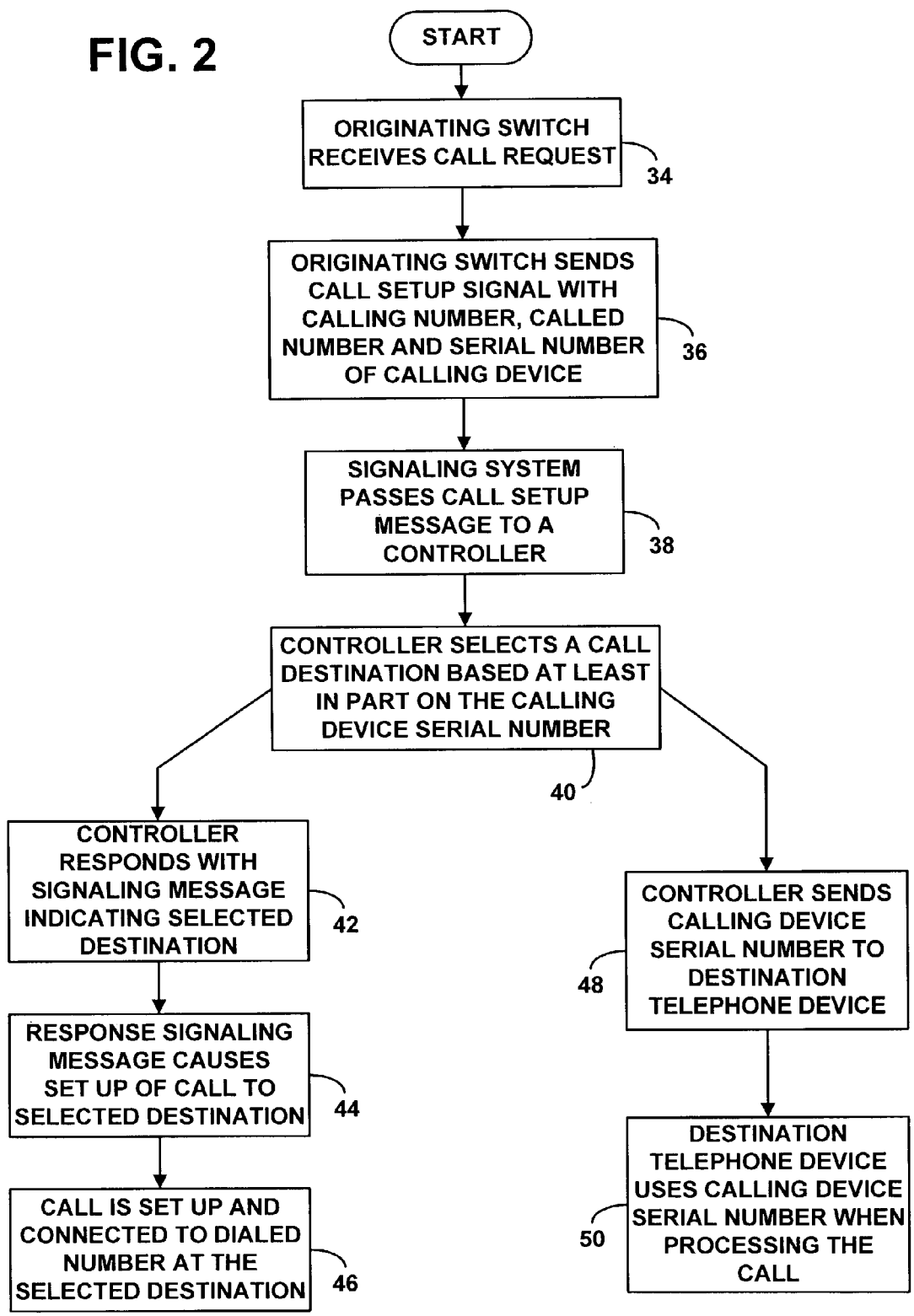
FIG. 2 is a flow chart depicting functions that could be carried out in the arrangement of FIG. 1.

Referring next to FIG. 2, a flow chart is provided to help illustrate how the exemplary embodiment could operate in practice in the arrangement of FIG. 1. It should be understood, however, that this process is an example and that variations are possible.

As shown in FIG. 2, at block 34, originating switch 16 receives a call request from originating telephone device (calling device) 24, seeking to place a call to a dialed number. At block 36, the originating switch then responsively sends into signaling system 14 a call setup message that carries parameters including (i) the calling number, (ii) a serial number of the calling device, and (iii) the called number. At block 38, the signaling system then passes the call setup message or a variation thereof to controller 32, which may be an intelligent router associated with the dialed number. Preferably, controller 32 thereby receives an indication of at least the serial number and telephone number of the calling device.

At block 40, upon receipt of these parameters, controller 32 uses the serial number of the calling device as a basis to select a destination to which the call should be routed. In this regard, for example, the controller 32 might refer to a data store (not shown) that correlates destination telephone devices 26, 28, 30 and/or destination switches 18, 20, 22 with various ranges of calling device serial numbers or with various specific calling device serial numbers. And the controller may thereby determine which of destination telephone devices 26, 28, 30 and/or destination switches 18, 20, 22 should receive the call.

As another example, the controller 32 might refer to translation data to correlate the calling device serial number with one or more calling device characteristics such as make, model and/or configuration. In turn, the controller 32 may then refer to a data store that correlates device characteristics with particular destinations. The controller may thereby determine which of destination telephone devices 26, 28, 30 and/or destination switches 18, 20, 22 should receive the call.

Each possible destination switch 18, 20, 22 preferably serves only one destination telephone device that has a given telephone number. Therefore, if controller 32 selects destination telephone device 26 to be the recipient of a call to the dialed number, controller has effectively selected destination switch 18 to receive the call. (The destination telephone device may in turn provide connectivity with more than one telephone station. An example of this is an ACD system, which may receive a call and then connect it to one of many possible operator terminals.)

At block 42, controller 32 then sends back into signaling system 14 a response signaling message that indicates the point code or other network address of the selected destination switch. And at block 44, that response signaling message and/or a variation thereof passes through the signaling system 14 back to the originating switch 16, thereby directing originating switch 16 and/or other entities in transport system 12 to route the call to the selected destination switch. At block 46, the call is then set up and connected from the originating switch 16 to the selected destination switch and from the selected destination switch to the destination telephone device having the dialed number.

As further shown by way of example in FIG. 2, at block 48, controller 32 may also send a signaling message to the destination telephone device that will receive the call. The signaling message preferably carries the calling number and the calling device serial number. At block 50, the destination telephone device may then use the calling device serial number as a basis to help process the incoming call, such as (i) by facilitating intelligent IVR interaction with the caller, (ii) by assisting in ACD efforts, and/or (iii) by retrieving corresponding device characteristics to display to an operator who answers the call. (Alternatively, the controller may send more express information about device characteristics to the destination telephone device, to facilitate the same sort of call processing.)

Figure 3:
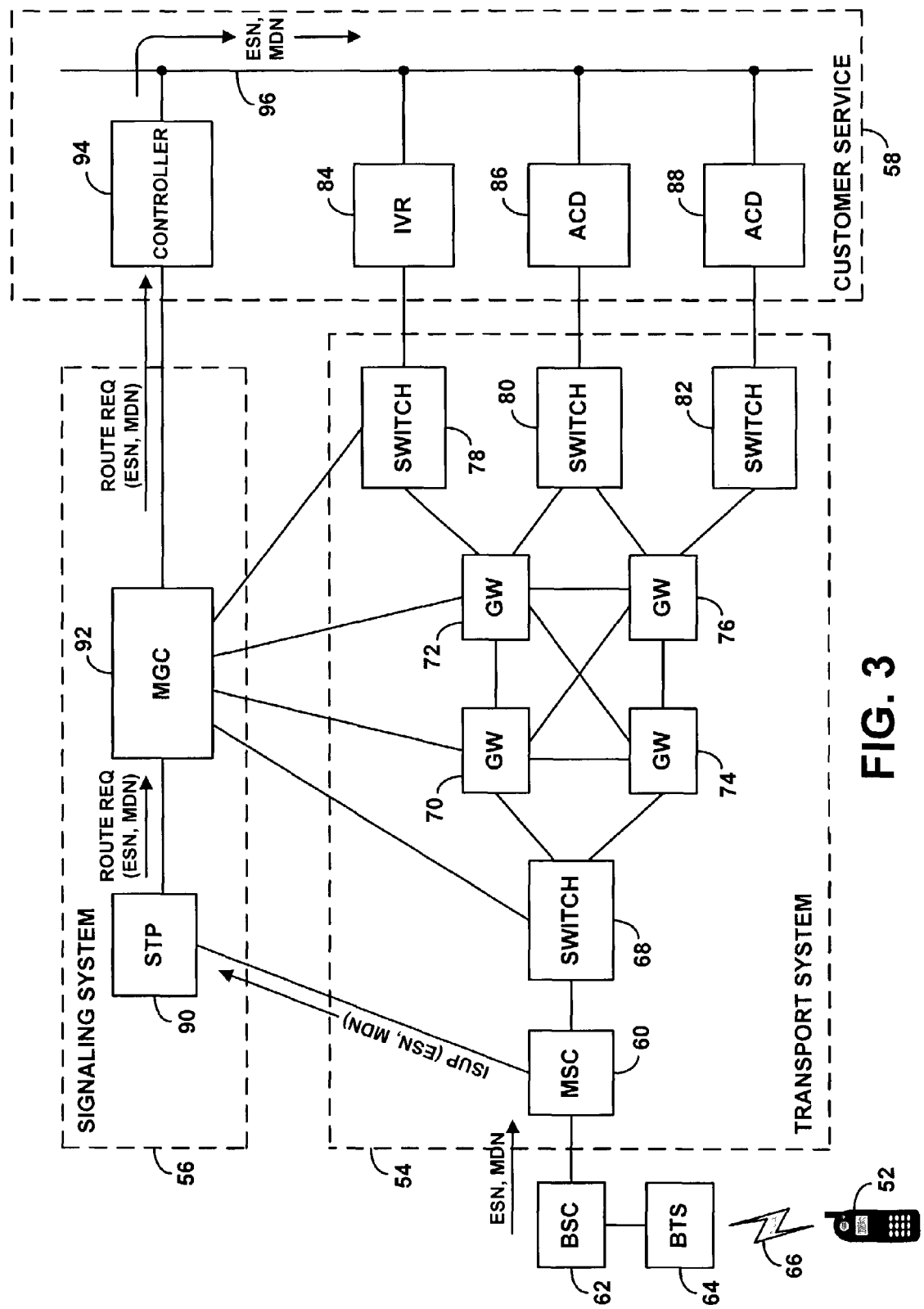
FIG. 3 is a block diagram of a communication system in which the exemplary embodiment can be applied to facilitate routing of customer service calls.
Figure 4:
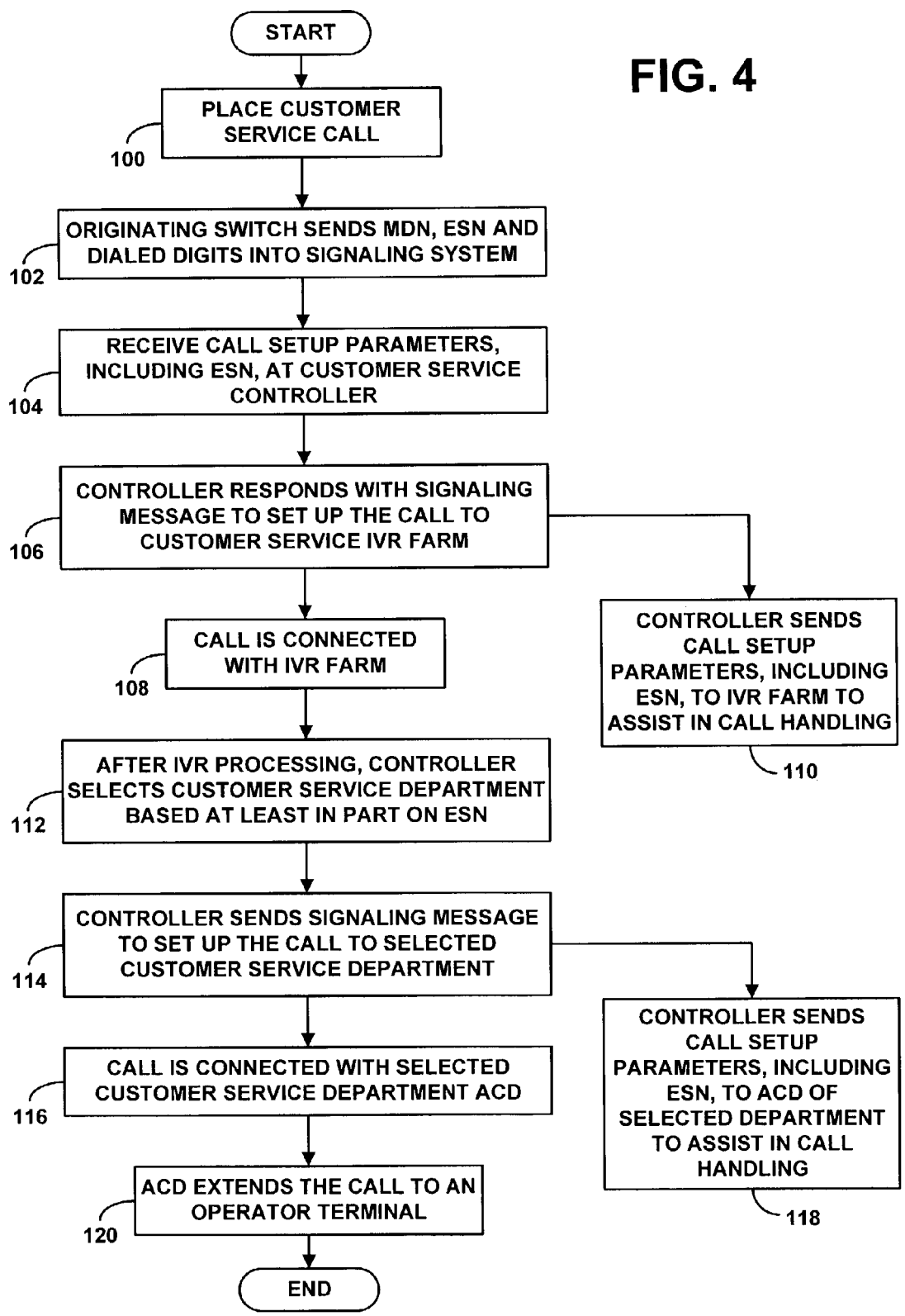
FIG. 4 is a flow chart depicting functions that could be carried out in the arrangement of FIG. 3.

As noted above, the exemplary embodiment can be usefully employed to facilitate routing of customer service calls. FIGS. 3 and 4 illustrate this scenario, where a person uses a cell phone to place a customer service call, seeking assistance with use of the cell phone for instance.

FIG. 3 first depicts an exemplary communication system that includes a cell phone 52, a transport system 54, a signaling system 56 and a customer service system 58. In this arrangement, a person using cell phone 52 could call customer service system 58 by dialing a customer service phone number, such as "*2" for instance, which would cause the system to connect the person's cell phone with customer service system 58.

Transport system 54 includes a mobile switching center (MSC) 60, which conventionally serves the cell phone 52 through a base station controller (BSC) 62, a base transceiver station (BTS) 64 and an air interface (e.g., a CDMA, TDMA, GSM, 802.11x or other air interface) 66. Transport system then further includes a packet-switched network comprising a number of switches, media gateways and/or other entities, shown by way of example as multiservice switch 68, media gateways 70, 72, 74, 76, and multiservice switches 78, 80, 82. In this exemplary arrangement, MSC 60 functions as an originating switch, and switches 78, 80 and 82 function as destination switches.

Each destination switch 78, 80, 82 then provides connectivity with a respective destination telephone device at customer service system 58. By way of example, destination switch 78 provides connectivity with an IVR farm (one or more IVR servers) 84, destination switch 80 provides connectivity with an ACD server 86, and destination switch 82 provides connectivity with another ACD server 88.

IVR farm 84 may be programmed by conventional means to respond initially to a customer service call and to then release the call and allow it to be connected to a particular customer service department. And ACD servers 86, 88 may then each function to distribute calls within a respective customer service department of system 58. Additional destination switches and destination telephone devices (e.g., additional ACD servers, serving other customer service departments) could be provided as well.

Signaling system 56, in turn, includes an STP 90 and a media gateway controller (MGC) 92. STP 90 is coupled with MSC 60 and is further coupled with MGC 92, and MGC 92 is coupled with switches and gateways in the packet-switched network of transport system 54. FIG. 3 shows only some of these links for simplicity. In general, MGC 92 can conventionally function to control the switches and gateways to which it is coupled, in a manner well known to those skilled in the art.

MGC 92 is then coupled with a controller 94, such as a Cisco Intelligent Contact Manger (ICM), at customer service system 58. And controller 94 is coupled by a signaling link 96 with the IVR server 84 and the various ACD servers 86, 88 in the customer service system 58. In this regard, peripheral gateways (not shown) may tie signaling link 96 with the IVR farm 84, with ACD server 86 and with ACD server 88.

It should be understood that the various components shown in FIG. 3 and elsewhere can include software, firmware and/or hardware components arranged to carry out the logic functions described herein. For example, an exemplary component may include a processor, data storage, and machine language instructions stored in the data storage and executable by the processor to carry out the described functions, in cooperation with one or more network interfaces for sending and receiving bearer and/or signaling traffic.

FIG. 4 next depicts process steps that could be carried out in the arrangement of FIG. 3 in accordance with the exemplary embodiment. To start, at block 100, a person using cell phone 52 may place a customer service call by dialing *2 or another designated number, which cell phone 52 may conventionally send in an origination message to MSC 60. Commonly, the origination request message will carry not only the dialed digits, but also the MDN of the calling phone and the ESN of the calling phone, for authentication purposes. And commonly, the MSC 60 will respond to the origination request by sending an ISUP IAM call setup message to STP 90, for delivery to a destination point code associated with the dialed number.

According to SS7, the ISUP IAM that MSC 60 sends would include an originating point code, a destination point code, the dialed digits and, optionally, the calling number (MDN) and calling name (which MSC 60 could determine from profile records). According to the exemplary embodiment, however, MSC 60 will further include in the IAM the ESN of the calling device, to facilitate routing of the call based on the calling device ESN. Thus, at block 102, MSC 60 may send an ISUP IAM that includes the dialed digits, the MDN of the calling device, and the ESN of the calling device.

In the exemplary embodiment, the destination point code specified in the ISUP IAM may correspond to MGC 92, in which case STP 90 would forward the call setup message to MGC 92. Further, STP 90 may translate the call setup message into an IS-41 Route message, still carrying the ESN, MDN and dialed digits, before sending it to MGC 92.

MGC 92 may then determine that the next signaling point for a call to those dialed digits is controller 94 at customer service system 58. Therefore, MGC 92 may then forward the call setup message to controller 94. And at block 104, the controller would thus receive the call setup message, including the ESN of the calling device.

Upon receipt of the call setup message, controller 94 may programmatically determine that the call should first be routed to IVR farm 84 and that IVR farm 84 is served by destination switch 78. Therefore, at block 106, the controller may send a response call setup message back into the signaling system 56, with an instruction to route the call to the point code of destination switch 78. Applying conventional procedures, the signaling points in signaling system 56 may then responsively set up the call to switch 78, and switch 78 may set up the call to IVR 84. For instance, MGC 92 may instruct switch 68 and gateways 70, 72 to set up the call to switch 78, and STP 90 may instruct MSC 60 to set up the call to switch 68. At block 108, the call may then be connected from cell phone 52, through transport system 54 to IVR farm 84.

Further, at block 110, controller 94 may forward a signaling message in any agreed format via signaling link 96 to IVR farm 84, giving IVR farm 84 the serial number of the calling device. IVR farm 84 may then query a database system to determine device characteristics of the device that has that serial number and could use that information in interacting with the caller. Alternatively, controller 94 or an associated entity could translate the serial number into device characteristic information and could pass that information to the IVR farm 84 for use in processing the call.

Once IVR farm 84 finishes initial processing the call, IVR farm 84 may signal back to controller 94 to alert the router that the initial processing of the call is complete. According to the exemplary embodiment, at block 112, controller 94 may then use the calling device ESN as a basis to select a destination customer service department that should handle the call from that point forward.

For example, controller 94 may programmatically query a data store that correlates ESNs (by ranges or specific numbers) with particular customer service departments and may thereby determine which customer service department is best suited to handle the call from the device having the calling device ESN. Or controller 94 or an associated entity may reference data to translate the ESN into device characteristics such as make and model, and may then select a customer service department that is best suited to handle the call from a device having those characteristics. Controller 94 may also take into account other factors, such as call distribution loads, in the process of selecting a customer service department that should receive the call.

Once controller 94 selects a customer service department that should receive the call, at block 114, the controller may send a signaling message to MGC 92 with instructions to set up the call to the ACD server of the selected department, such as ACD server 86 for instance. In response, MGC 92 may instruct switch 78 to release the call, may instruct switch 68 and gateways 70, 72 to set up the call to switch 80, and may instruct switch 80 to set up the call to ACD server 86. At block 116, the call may then be connected from switch 68 to switch 80 and through to ACD 86.

Further, at block 118, controller 94 may forward a signaling message in an agreed format via signaling link 96 to the selected ACD server 86, giving the ACD server 86 the serial number of the calling device. ACD server 86 may then use the serial number as a basis to determine where to route the call within the customer service department. For instance, ACD could query reference data to correlate the ESN with a destination operator terminal or group of terminals, or ACD server 86 could translate the ESN into calling device characteristics and could select a destination based on those device characteristics. Alternatively, controller 94 could translate the serial number into device characteristic information and could pass that information to the ACD server 86 for use by ACD server 86 in distributing the call within the department. At block 120, the ACD server then extends the call to the destination operator terminal for handling.

Many variations on the arrangements and processes described above are possible. For example, in the arrangement shown in FIGS. 3 and 4, it is possible that the IVR farm could be eliminated from the process. Thus, for instance, the customer service controller 94 could initially select a destination customer service department, based at least in part on the serial number of the calling device, and could respond with an instruction to route the call to the selected department.

As another example, it is possible that the calling device will not itself send its serial number to the originating switch when originating a call. In that case, the originating switch might determine the serial number of the calling device by querying a controller or database system, based on the telephone number of the calling device.

As yet another example, it is possible that the originating switch will not send the serial number of the calling device into the signaling system. Instead, the originating switch might send a more conventional call setup message that does not include the serial number, and an entity in the signaling system (e.g., an STP or MGC) might determine the serial number of the calling device. The entity itself may then use the serial number as a basis to determine where the call should be routed, or the entity may pass the serial number along to another entity that may determine where the call should be routed.

As still another example, it is possible that an originating switch itself may use the serial number of a calling device as a basis to select a destination point for the call. For instance, in the arrangement of FIG. 3, MSC 60 might use the ESN of the calling cell phone as a basis to select one of destination switches 78, 80, 82 to which the call should be routed, and MSC 60 may then send an ISUP IAM to the point code of the selected destination switch.

As yet a further example, the exemplary embodiment could be used more generally by any switch or associated signaling point to select a next switch or other node to which a call should be routed. Thus, generally, when a switch or associated signaling point receives a request to set up a call from a particular calling number to a particular called number, the switch or associated signaling point could receive or otherwise determine a serial number of the calling device and could use that serial number as a basis to select next switch to which the call should be routed on its way to the called number. The switch or signaling point may then set up the call to that next switch.

And as still another example, although the foregoing description is focused mainly on use of device serial number as a basis to route a call, the arrangements described above could instead be keyed more generally to calling device type, such as to the make model and/or configuration of the calling device. For instance, when a calling device places a call, the calling device could send to an originating switch a device-type indicator, which specifies what type of device (e.g., make, model and/or configuration) is placing the call. Such an indicator could be coded in any agreed form. Alternatively, the originating switch could query an SCP other controller or logic to determine the device-type indicator for the calling device. In the example of FIG. 3, the device-type indicator could then pass in call setup signaling along to controller 94, which could use the device-type indicator as a basis to select a customer service department that should receive the call.

More generally, those skilled in the art will understand that changes and modifications may be made to the embodiment described above without departing from the true scope and spirit of the present invention, which is defined by the claims.

We claim:

1. In a communication system in which a device operates under an assigned directory number and has a device type, a method comprising:
   receiving into a network node a request to set up a call from the device to a dialed number;
   determining a unique serial number of the device as an indication of the device type, wherein the serial number uniquely identifies the device compared with all other devices; and
   based at least in part on the serial number, selecting a destination to which the call should be routed in order to establish a connection to the dialed number, wherein selecting the destination to which the call should be routed comprises at least one of (i) selecting a customer service center to which the call should be routed, in which case the destination comprises the customer service center, (ii) selecting a customer service department to which the call should be routed, in which case the destination comprises the customer service department, (iii) selecting an operator terminal to which the call should be routed, in which case the destination comprises the operator terminal, and (iv) selecting a set of operator terminals to which the call should be routed, in which case the destination comprises the set of operator terminals,
   wherein selecting the destination based at least in part on the serial number comprises (i) performing a data lookup to determine based on the serial number at least one characteristic of the device selected from the group consisting of manufacturer of the device, and model of the device, and (ii) selecting the destination based at least in part on the at least one determined characteristic of the device.

2. The method of claim 1, further comprising routing the call to the selected destination.

3. The method of claim 1, wherein the device type comprises at least one of (i) the make of the device, (ii) the model of the device and (iii) the configuration of the device.

4. The method of claim 1, wherein determining the serial number comprises receiving the serial number in a call origination request from the device.

5. The method of claim 1, wherein determining the serial number comprises looking up the serial number of the device having the assigned directory number.

6. The method of claim 1, wherein the device is a cell phone and the serial number is an electronic serial number of the cell phone.

7. The method of claim 1, wherein the network node comprises a switch, and wherein receiving into a network node a request to set up call from the device to a dialed number comprises the switch receiving a call origination request from the device, the call origination request providing the switch with the dialed number.

8. The method of claim 7, wherein selecting a destination based at least in part on the serial number comprises the switch selecting the destination based at least in part on the serial number.

9. The method of claim 7, further comprising:
   the switch sending into a signaling system a call setup message conveying the serial number,
   wherein selecting a destination based at least in part on the serial number comprises a signaling point in the signaling system receiving the serial number and selecting the destination based at least in part on the serial number.

10. The method of claim 7, further comprising:
    the switch sending into a signaling system a call setup message conveying the serial number; and
    the signaling system passing the serial number to a controller associated with the dialed number,
    wherein selecting a destination based at least in part on the serial number comprises the controller receiving the serial number, performing the lookup, and selecting the destination based at least in part on the at least one determined characteristic.

11. A method comprising:
    a switch receiving from a cell phone a request to connect a call to a customer service telephone number, the request conveying from the cell phone to the switch (i) a directory number of the cell phone, (ii) a serial number of the cell phone that uniquely identifies the cell phone as compared with all other devices, and (iii) the customer service telephone number;
    the switch responsively sending a call setup signal into a signaling system, conveying in the call setup signal at least the serial number;
    the signaling system passing the serial number to a customer service controller;
    the customer service controller using the serial number as a basis to select a customer service destination for the call, wherein the customer service destination comprises at least one of a customer service center, a customer service department, an operator terminal, and a set of operator terminals, and wherein using the serial number as a basis to select the customer service destination for the call comprises (i) performing a data lookup to determine based on the serial number at least one characteristic of the cell phone selected from the group consisting of manufacturer of the cell phone, and model of the cell phone, and (ii) selecting the customer service destination based at least in part on the at least one determined characteristic of the cell phone;

the customer service controller sending a signaling message into the signaling system instructing to route the call to the selected customer service destination; and routing the call to the selected customer service destination.

12. The method of claim 11, further comprising:

the customer service controller passing the serial number to the selected customer service destination, for use by the destination in processing the call.

13. The method of claim 11, further comprising:

the customer service controller passing an indication of the at least one determined characteristic of the cell phone to the selected customer service destination, for use by the destination in processing the call.

14. The method of claim 11, wherein the call setup signal is an ISUP IAM signal.

15. A system comprising:

a switch that receives a request to connect a call from a calling device to a called number; and logic for selecting a destination for the call based at least in part on a calling device type;

wherein the logic for selecting a destination for the call based at least in part on a calling device type comprises logic for receiving a serial number that uniquely identifies the calling device as compared with all other devices, determining a particular calling device type based on the serial number, and selecting a destination for the call based on the particular calling device type, wherein the calling device type is selected from the group consisting of manufacturer of the calling device, and model of the calling device, and wherein the selected destination comprises at least one of a customer service center, a customer service department, an operator terminal, and a set of operator terminals.

16. The system of claim 15, wherein the serial number is indicated in the request.

* * * * *